H. SAUCKE.
METAL DRILL.
APPLICATION FILED SEPT. 26, 1919.
1,394,865.
Patented Oct. 25, 1921.
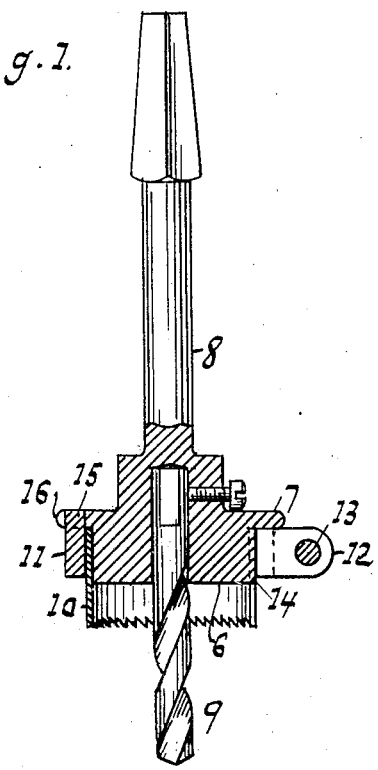
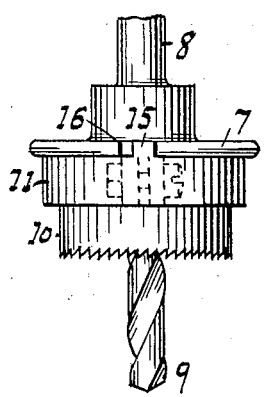
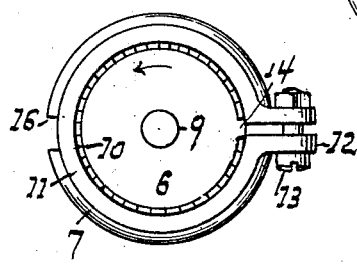
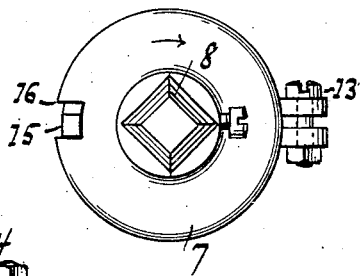
INVENTOR
Herman Saucke
BY
Hauff & Varland
ATTORNEYS

UNITED STATES PATENT OFFICE.

HERMAN SAUCKE, OF NEW YORK, N. Y.

METAL-DRILL.

1,394,865.  Specification of Letters Patent.  Patented Oct. 25, 1921.

Application filed September 26, 1919. Serial No. 326,507.

*To all whom it may concern:*

Be it known that I, HERMAN SAUCKE, a citizen of the United States, residing at New York, in the county of Bronx and State of New York, have invented new and useful Improvements in Metal-Drills, of which the following is a specification.

This invention relates essentially to a drill which is adapted for cutting circular holes in a metal shell such as a hot water boiler, so as to facilitate the fitting of additional pipes to a boiler that has been installed or set up in a dwelling.

The object of the invention is to provide an inexpensive tool for cutting a circular hole of predetermined diameter in metal by revolving a tool holder provided with a segmental hack saw mounted thereon.

The invention is designed to fundamentally comprehend means for readily securing the saw against centrifugal and circumferential movement relative to the holder.

The invention resides more particularly in the novel combinations hereinafter described and claimed, reference being made to the accompanying drawing in which:

Figure 1 represents a sectional side elevation of a tool embodying this invention.

Fig. 2 is an inverted plan view of the same.

Fig. 3 is a front elevation of the lower portion of the tool.

Fig. 4 is a plan view of Fig. 1.

In the drawing the numeral 6 designates a holder or head which is substantially cylindrical and is provided with a flange 7 of larger diameter than the holder to form a rim surrounding the top. Projecting from the top of the flange is a stem or shank 8 having an angular upper end so that the stem can be inserted into the chuck of a brace and be revolved as is well known.

A twist drill 9 suitable for centering the tool by routing or piercing the center portion of the proposed cut is fastened in the holder.

On the holder is arranged a hack saw 10 having its lower edge serrated to cut into the metal. The saw is made of a flat strip of resilient steel and is bent to practically surround the face of the head below the flange. The upper edge of the saw abuts on the inner portion of the flange, and a clamp consisting of a band or strip 11 embraces the saw where it sets about the face of the holder. The band is formed of spring metal and each end of it has an ear 12 bent at right angles to the body for supporting an adjustable bolt or screw 13 made to pass through eyes in the ears.

When the nut is turned it draws the ears toward each other thus contracting the band to press the saw against the periphery of the holder thereby frictionally securing the saw. In order to prevent circumferential movement or shift of the saw a boss or ledge 14 located on the circumference of the holder will serve as a stop for coaction with the ends of the saw as indicated in Fig. 2. The band of course, when screwed up extra tight will securely hold the saw in place, but it has been found by practice that the stop is necessary to engage both ends of the saw as shown thereby eliminating any tendency of the saw to move relative to the clamp and holder.

As shown in the drawings, the band is guided to aline it in the proper place, and at the same time prevent circumferential movement caused by torsional strain by means of a lug 15 projecting upwardly from the edge of the band coöperating with a notch or slot 16 situated in the edge of the flange. By permitting play room of the lug in the slot it allows the ends of the band to be drawn together when in place, and at the same time the strain on the saw of cutting into the metal is partly taken up by the lug impinging on the end of the slot.

When it is desired to remove the saw blade from the holder it will only be necessary to loosen the nut or screw so as to expand the band clamp and slip the blade downward off the holder.

Modifications of the invention may be made within the law of equivalents and scope of the claims for example the clamp as shown consists of a split ring, but it could be made of two segments each segment having a pair of ears and a pair of bolts to hold the segments together.

I claim:

1. A metal drill comprising a cylindrical holder having a rim surrounding the top, a segmental saw arranged about the holder to abut against the rim, an adjustable band embracing the saw, and means forming an integral part of the band made to engage the rim preventing circumferential movement of the band.

2. A metal drill comprising a cylindrical holder having a rim surrounding the top, a segmental saw arranged about the holder to abut against the rim, an adjustable band embracing the saw, and a ledge formed on the holder coacting with the ends of the saw for eliminating circumferential shift of the saw.

3. A metal drill comprising a cylindrical holder having a rim surrounding the top, a segmental saw arranged about the holder to abut against the rim, an adjustable band embracing the saw, a notch located in the rim, a lug on the band coöperating with the notch for preventing circumferential movement of the band, and a ledge formed on the holder coacting with the ends of the saw for eliminating circumferential shift of the saw.

In testimony whereof I have hereunto set my hand in the presence of two subscribing witnesses.

HERMAN SAUCKE.

Witnesses:
WILLIAM MILLER,
SAMUEL LEWIS.